US010298356B1

(12) United States Patent
Châtelain et al.

(10) Patent No.: US 10,298,356 B1
(45) Date of Patent: May 21, 2019

(54) OPTIMAL PARTIAL RECONFIGURATION OF SPECTRUM IN OPTICAL NETWORKS

(71) Applicant: Ciena Corporation, Hanover, MD (US)

(72) Inventors: Benoît Châtelain, Rosemere (CA); Simon Brueckheimer, London (GB); David Stacey, Newbury (GB); Khaled Maamoun, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/887,073

(22) Filed: Feb. 2, 2018

(51) Int. Cl.
  *H04J 14/02* (2006.01)
  *H04B 10/508* (2013.01)
  *H04B 10/077* (2013.01)

(52) U.S. Cl.
  CPC .................. *H04J 14/0227* (2013.01)

(58) Field of Classification Search
  USPC ........................................ 398/34, 69, 76, 79
  See application file for complete search history.

(56) References Cited

U.S. PATENT DOCUMENTS

| | | | |
|---|---|---|---|
| 7,103,003 B2 | 9/2006 | Brueckheimer et al. | |
| 7,453,824 B1* | 11/2008 | Nucci ................. | H04J 14/0227 370/254 |
| 9,628,189 B2 | 4/2017 | Châtelain et al. | |
| 9,686,599 B2 | 6/2017 | Maamoun | |
| 2004/0153492 A1* | 8/2004 | Cao .................... | H04J 14/0212 709/200 |
| 2007/0172237 A1* | 7/2007 | Risbood ............. | H04J 14/0227 398/59 |
| 2014/0308037 A1* | 10/2014 | Hu ...................... | H04J 14/0257 398/47 |
| 2016/0277118 A1* | 9/2016 | Chatelain ............ | H04B 10/508 |
| 2017/0353243 A1 | 12/2017 | Brueckheimer et al. | |
| 2018/0026716 A1* | 1/2018 | Takita ................. | H04J 14/0263 398/82 |
| 2018/0123724 A1* | 5/2018 | Zhang ................. | H04J 14/0212 |

OTHER PUBLICATIONS

Mutalik "Solving Combinatorial Optimization Problems Using Parallel Simulated Annealing and Parallel Genetic Algorithms" ACM 1992 (Year: 1992).*
International Telecommunication Union, ITU-T G.694.1, Telecommunication Standardization Sector of ITU, Spectral grids for WDM applications: DWDM frequency grid, Feb. 2012, pp. 1-16.

* cited by examiner

*Primary Examiner* — Oommen Jacob
(74) *Attorney, Agent, or Firm* — Clements Bernard Walker PLLC; Christopher L. Bernard; Lawrence A. Baratta, Jr.

(57) ABSTRACT

Partial optimization systems and methods of wavelengths or spectrum in an optical network include, based on current services in the optical network each having a route and wavelength assignment and based on a ratio of services that can be changed in the partial optimization, preforming a first stage optimization to determine which of the current services are changed for one or more of the route and the wavelength assignment to attain a reduction of a number of wavelengths; performing a second stage optimization to determine an order of implementing changes from the first stage optimization that with the order minimizing one or more of conflicts and step counts; and causing implementation of the changes in the optical network.

16 Claims, 9 Drawing Sheets

OPTIMAL PARTIAL RECONFIGURATION OF SPECTRUM IN OPTICAL NETWORKS

FIELD OF THE DISCLOSURE

The present disclosure generally relates to optical networking systems and methods. More particularly, the present disclosure relates to systems and methods for the optimal partial reconfiguration of spectrum/wavelengths in optical networks such as Dense Wavelength Division Multiplexing (DWDM) networks.

BACKGROUND OF THE DISCLOSURE

Routing and Wavelength Assignment (RWA) is a well-known problem for fixed grid optical networks while Routing and Spectrum Assignment (RSA) is its equivalent term to the same problem for flexible grid optical networks. In fixed grid optical networks, wavelengths are spaced apart from each other according to a wavelength spectrum grid defined by International Telecommunication Union (ITU) in ITU-T G.694.1 (02/12), "Spectral grids for WDM applications: DWDM frequency grid," the contents of which are incorporated by reference. In flexible grid optical networks, which is also described in ITU Recommendation G.694.1 "Spectral grids for WDM applications: DWDM frequency grid" (02/12), each signal can be allocated to spectrum with different widths optimized for the bandwidth requirements of the particular bit rate and modulation scheme of the individual channels. The ultimate objective of RWA or RSA is to find a wavelength or spectrum assignment on a route for a particular channel in the optical network, such assignment and routing being optimal in some manner.

A wide variety of static and dynamic RWA and RSA optimization algorithms are known. However, these approaches do not address partial reconfiguration of a set of services or do so with the pragmatic perspective of the operator (performance versus cost or performance versus service disruption/interruption tradeoffs), and furthermore, even where optimization is proposed, none of them attempt to minimize the real-world implementation cost, i.e., the number of steps involved in the reconfiguration. Note, a service can be a photonic Subnetwork Connection (p-SNC) which is managed by a control plane. Where partial reconfiguration may have been considered, RWA and RSA algorithms are applied in consideration of all the p-SNCs in the network that can be reconfigured, exactly as it would be done for a greenfield deployment (new). Once optimization is obtained, reconfiguration of p-SNCs proceeds sequentially until the wavelength count reduction objective is attained, but without bound or even knowledge of the number of steps required or the temporary wavelength allocation requirements.

BRIEF SUMMARY OF THE DISCLOSURE

This conventional approach inevitably results in a sub-optimal solution since the primary objective is to re-route all the p-SNCs in the network, of which only a fraction may be implemented. The main shortcomings of the conventional approach are that the wavelength count will not be reduced as much as it could be for a given ratio of p-SNCs that are reconfigured, and the cost of implementation is largely unbounded. This has meant that automatic optimization has been largely avoided in practice. Furthermore, most conventional RWA and RSA algorithms can only provide solutions for a small to medium network size (e.g., less than 50-100 nodes).

In an embodiment, a partial optimization method of wavelengths or spectrum in an optical network, based on current services in the optical network each having a route and wavelength or spectrum assignment and based on a proportion of services, performing a first stage optimization to determine which of the current services are changed for one or more of the route and the wavelength or spectrum assignment to attain a measurable advantage; performing a second stage optimization to determine an order of implementing changes from the first stage optimization with that order minimizing one or more of conflicts and step counts; and causing implementation of the changes in the optical network based on the order to affect the measurable advantage. The partial optimization method can further include performing a plurality of the first stage optimization and the second stage optimization with different values of the ratio of services; and providing an output of the different values of the ratio of services and corresponding wavelength reduction and step count.

The first stage optimization can utilize Integer Linear Programming to minimize an objective function to select routes for which of the current services to change. The first stage optimization can utilize a Tabu search to determine wavelength assignment. Responsive to the Integer Linear Programming being intractable, the first stage optimization can utilize a genetic algorithm to determine wavelength assignment. The second stage optimization can utilize dual, parallel heuristic optimization to minimize the step counts. The dual, parallel heuristic optimization can include a genetic algorithm and a simulated annealing process.

In another embodiment, a server configured to perform a partial optimization of wavelengths or spectrum in an optical network includes a processor; and memory storing instructions that, when executed, cause the processor to, based on current services in the optical network each having a route and wavelength assignment and based on a proportion of services that can be changed in the partial optimization, perform a first stage optimization to determine which of the current services are changed for one or more of the route and the wavelength assignment to attain a measurable advantage, perform a second stage optimization to determine an order of implementing changes from the first stage optimization that with the order minimizing one or more of conflicts and step counts, and cause implementation of the changes in the optical network based on the order to affect the measurable advantage. The memory storing instructions that, when executed, can further cause the processor to perform a plurality of the first stage optimization and the second stage optimization with different values of the ratio of services, and provide an output of the different values of the ratio of services and corresponding wavelength reduction and step count.

The first stage optimization can utilize Integer Linear Programming to minimize an objective function to select routes for which of the current services to change. The first stage optimization can utilize a Tabu search to determine wavelength assignment. Responsive to the Integer Linear Programming being intractable, the first stage optimization can utilize a genetic algorithm to determine the reconfigurable p-SNCs and their route assignment. The second stage optimization can utilize dual, parallel heuristic optimization to minimize the step counts. The dual, parallel heuristic optimization can include a genetic algorithm and a simulated annealing process.

In a further embodiment, an apparatus configured to perform a partial optimization of wavelengths or spectrum in an optical network includes circuitry configured to perform, based on current services in the optical network each having a route and wavelength assignment and based on a proportion of services that can be changed in the partial optimization, a first stage optimization to determine which of the current services are changed for one or more of the route and the wavelength assignment to attain a measurable advantage, circuitry configured to perform a second stage optimization to determine an order of implementing changes from the first stage optimization that with the order minimizing one or more of conflicts and step counts, and circuitry configured to cause implementation of the changes in the optical network based on the order to affect the measurable advantage. The apparatus can further include circuitry configured perform a plurality of the first stage optimization and the second stage optimization with different values of the ratio of services; and circuitry configured provide an output of the different values of the ratio of services and corresponding wavelength reduction and step count.

The first stage optimization can utilize Integer Linear Programming to minimize an objective function to select routes for which of the current services to change. The first stage optimization can utilize a Tabu search to determine wavelength assignment. The second stage optimization can utilize dual, parallel heuristic optimization to minimize the step counts. The dual, parallel heuristic optimization can include a genetic algorithm and a simulated annealing process.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
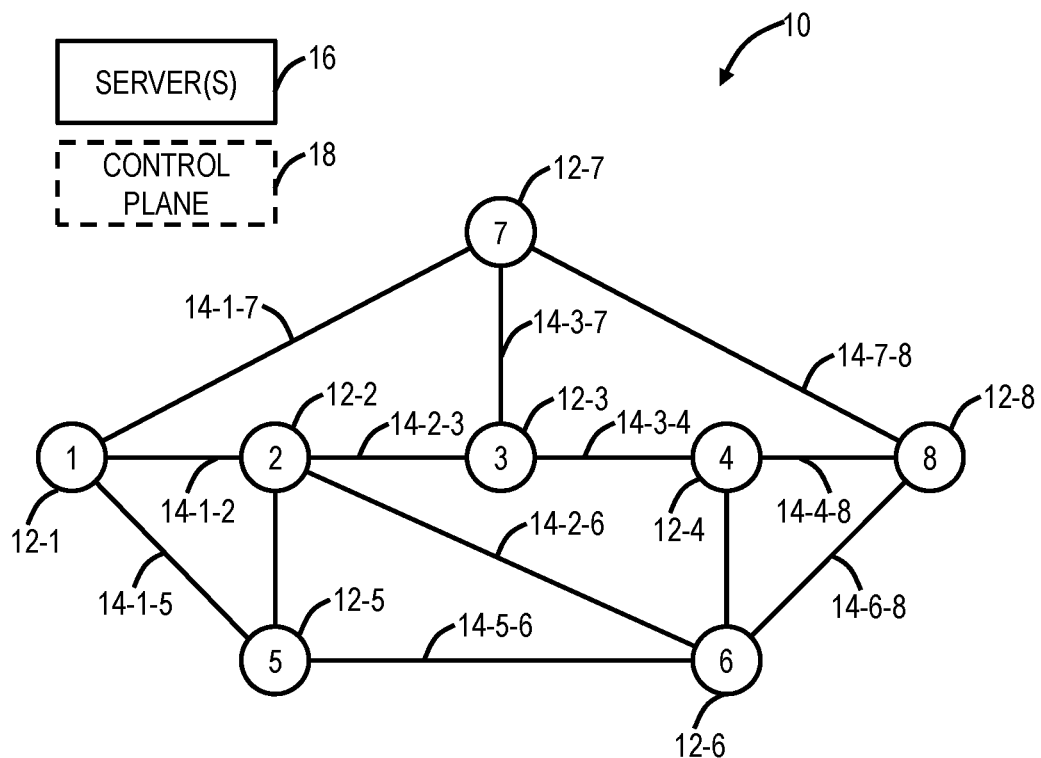
FIG. 1 is a network diagram of an optical network.

In various embodiments, the present disclosure relates to systems and methods for the optimal partial reconfiguration of spectrum/wavelengths in optical networks such as Dense Wavelength Division Multiplexing (DWDM) networks. The systems and methods include an off-line or on-line process that can occasionally and maximally optimize the routing and wavelength assignment by reconfiguration of only a limited proportion of the existing p-SNCs and providing instructions in which order to make those changes. The process can be configured to operate continuously, to an autonomous schedule, or on demand under the control of the network operator. That is, the systems and methods optimize a limited number (partial) of services, and the systems and methods optimize the order in which wavelengths are reconfigured. By doing so, overall wavelength count, as well as the link congestion, is reduced for the minimum of effort, thereby allowing another reasonable period for the untrammeled deployment of new p-SNCs. The main outcome of the systems and methods is that it enables operators to realize the full potential capacity of their network at a reduced cost, forestalling further a need to lay new fiber and/or install new networking equipment and maximizing value.

The systems and methods determine the attainable wavelength count reduction according to the percentage of p-SNCs for optimization. Additionally, the systems and methods optimize the sequence in which the p-SNCs are re-configured, i.e., reducing the number of reconfiguration steps by optimizing the order in which the p-SNCs are reconfigured. These two aspects may be further combined to determine the optimum proportion of p-SNCs that achieves a dual goal of maximizing recovered capacity and minimizing the number of reconfiguration steps and balancing those outcomes. The systems and methods may be applied and have also been tested on a network size of more than 500 nodes without penalty.

The systems and methods include novel proportion-of-network optimization schemes, i.e., the proposed procedures allow network operators to quantify and thus trade-off performance and capacity recovery of partial reconfiguration versus its implementation cost/effort. That approach may additionally be used to determine precisely, using projected traffic growth for example, the number of new p-SNCs that can be deployed after partial reconfiguration, a real metric for Return on Investment (ROI) and capacity planning purposes. This outcome may also be used to steer the proportion-of-network optimization process.

The systems and methods prescribe the sequence and reduce the number of steps of a partial reconfiguration of p-SNCs and by extension the number of maintenance windows and other costs. It is typical of the high link spectrum usage and sub-optimal path length aspects of a network prior to any reconfiguration, that any re-configuration of p-SNCs will more likely than not involve some p-SNCs being allocated a temporary wavelength, before being able to configure them on their destined new path and wavelength. By optimizing the order in which p-SNCs are reconfigured, the proposed approach minimizes the use of temporary wavelengths and the overall number of steps making the reconfiguration less costly and faster to execute.

The systems and methods are specifically tailored to the context of the overarching goals for efficiency and performance. All the sub-problems of partial reconfiguration belong to the class of Nondeterministic Polynomial (NP)-Complete problems (those which cannot be solved deterministically in polynomial time), which has required the formulation and implementation of novel objective functions as well as appropriate selection and implementation of a preferred embodiment of a combination of optimization models that will succeed to find solutions for the widest variation of input criteria and states, and for the lowest computational burden.

Optical Network

FIG. 1 is a network diagram of an optical network 10. The optical network 10 includes nodes 12, labeled as nodes 12-1-12-8, interconnected to one another via links 14 which physically can include one or more optical fibers. The nodes 12 can also be referred to as network elements and can include, without limitation, Wavelength Division Multiplex (WDM) terminals, DWDM terminals, Optical Add/Drop Multiplexers (OADMs), Reconfigurable OADMs (ROADMs), optical cross connects, optical switches, Packet-Optical Transport Systems (POTS), and the like. In various embodiments, the nodes 12 include various hardware and software to communicate with one another via wavelengths, timeslots, packets, etc. At a physical layer, the nodes 12 provide one or more wavelengths between one another over the links 14. Note, while FIG. 1 shows a single node 12 at each location, there can be multiple devices or network elements providing multiple wavelengths. As is described herein, the wavelengths are services or p-SNCs.

For illustration purposes, each of the links is labeled as link 14-X-Y where X and Y are the nodes interconnected by the links 14. The links 14 utilize spectrum governed by ITU-T G.694.1 (02/12) for both fixed and flexible grids. The purpose of RWA/RSA is to assign wavelengths or spectrum optimally across the links 14 in a manner that minimizes chances of blocking in the optical network 10. Blocking means that a particular wavelength or spectrum is unavailable on one or more links, preventing a connection. Note that to route a p-SNC (without recourse to optical regeneration) the same wavelength (on in flexible grid same allocation of spectrum) must be free on all of the links making up the path between the two endpoints. Stated differently, RWA/RSA answers the question of which route and wavelength or spectrum should be assigned to a particular A-Z connection in the network 10 in a manner that minimizes the chance of blocking either A-Z, other paths reliant on A-Z in whole or part, or wider portions of the network.

The optical network 10 can also include one or more servers 16 and/or a control plane 18. The servers 16 can include or operate as, for example, a Software Defined Networking (SDN) controller, an SDN application, a Network Management System (NMS), an Element Management System (EMS), a planning tool, a Path Computation Element (PCE), etc. The control plane 18 provides an automatic allocation of network resources in an end-to-end manner. Examples of control planes may include Automatically Switched Optical Network (ASON) as defined in ITU-T G.8080/Y.1304, Architecture for the automatically switched optical network (ASON) (02/2012), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. That is, the control plane 18 is configured to establish end-to-end signaled connections to route the p-SNCs and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane).

In various embodiments, the partial optimization systems and methods can be implemented through the nodes 12, the servers 16, and/or the control plane 18. In particular, the partial optimization can be determined by one of the servers 16 and the implementation can be through the nodes 12. The server 16 can communicate with the network 10 via various techniques including Optical Service Channels (OSCs), Data Communication Networks (DCN), overhead channels, etc.

RWA/RSA

The general purpose for using RWA or RSA methods is to optimize the network capacity for a given number of established connections. Each connection request must be given a route and wavelength or spectrum. The consequential goals of both RWA and RSA are to minimize the blocking probability for new services, to maintain load balance, i.e., an even or biased distribution of traffic, and to reduce the number of spectrum slots used. RWA/RSA optimization is usually performed to minimize resources or utilization when planning greenfield DWDM network deployments. Either heuristics or exact approaches are used to determine the p-SNC routing and wavelength allocation that minimizes the total wavelength count or spectrum usage and possibly also path lengths, thereby minimizing connection blocking probability and maximizing network capacity. In the following description references to "minimizing" are to be understood in relative terms as "reducing" and conversely references to "maximizing" are to be understood in relative terms as "increasing." For certainty an absolute meaning of these qualifiers is not implied and unintended.

However, once an optical network 10 has been deployed, new p-SNCs are often manually (or sometimes automatically) planned and added in the optical network 10 on a first-come, first served basis such as by following a shortest path first assignment, and a first available wavelength or spectrum policy. Even if more advanced routing and wavelength assignment strategies are used, the ad-hoc addition of p-SNCs inevitably results over time in fragmentation of spectrum usage and premature blocking conditions.

A culminating point is reached as p-SNCs are added and optical links, or even more prematurely desirable and often used paths in the optical network 10 become fully utilized, preventing new p-SNCs and services from being established (or forcing the use of sub-optimally routed p-SNCs to be used compounding resource fragmentation). At that stage, assuming that the latest optical modem technology is used and that spectral efficiency cannot be further improved, network operators can only but either lay new fibers along the most congested links and/or deploy more optical networking equipment, or, as is the present focus, change the route and wavelength assignment of as many of the existing p-SNCs to free spectrum slots. It must be noted though that the cost of re-routing a p-SNC and changing its operating wavelength is usually high since this involves assigning a maintenance window, re-assigning Layer 1 (or higher) services, and sending technical personnel to sites to change fiber connections and to provision photonic equipment. While recent colorless, directionless and contentionless ROADM technologies may alleviate the need to send technicians to sites for some operators with such equipment, a maintenance window is still needed to re-assign higher layer services and to deploy a p-SNC on its new route and new wavelength, which may indeed also interrupt actual service.

Partial Optimization

Figure 2:
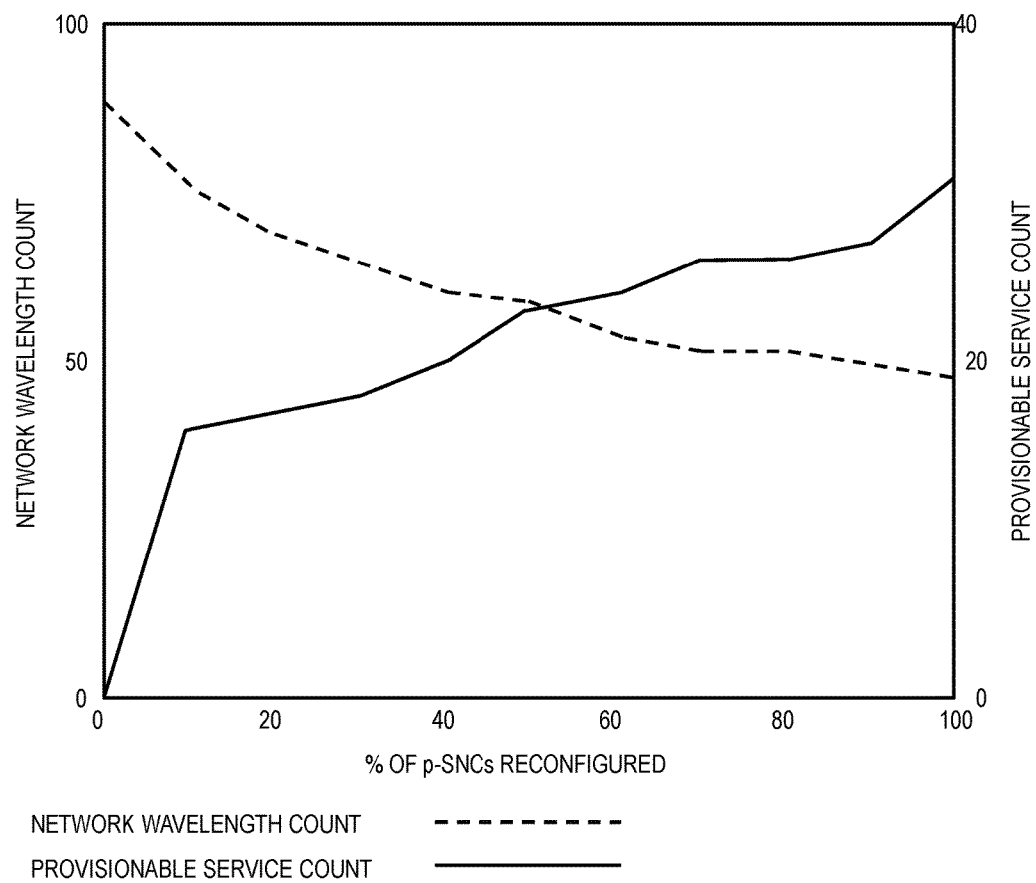
FIG. 2 is a graph which shows a typical result of the partial optimization, the main principle behind the partial optimization, and trade-off between network partial reconfiguration performance and cost.

FIG. 2 is a graph which shows the trade-off between network reconfiguration benefits and cost, and therefore the advantages of partial reconfiguration. The horizontal axis represents the amount of reconfiguration, expressed in terms of the percentage of p-SNCs that need to be reconfigured (re-routed and or assigned a new wavelength). The higher the percentage (ratio of reconfigured versus total), the higher the number of p-SNCs to reconfigure. Concomitant costs are at least directly proportional to the volume of reconfiguration, if not exponentially related due to the need to potentially move wavelengths more than once in the stepwise implementation of the optimization of resources. The left vertical axis of FIG. 2 corresponds to the overall wavelength count in the network (wavelengths used at least once). Prior to any reconfiguration (by definition, a p-SNC ratio of 0%), the wavelength count will be high in mature networks, typically near 88 wavelengths (for a fixed grid 88 wavelength system), also resulting in relatively high blocking probability. As the percentage of reconfigured p-SNCs increases, the wavelength count (fundamental to the optimization's objective function) drops, e.g., from 88 to 76 at 10% p-SNCs reconfigured, and to 69 at 20% p-SNCs reconfigured. As the percentage increases to maximum (p-SNC ratio of 100%), a limit is reached for the optimal minimum number of wavelengths. In the example shown in FIG. 2, this is 48 wavelengths.

In contrast, the right-hand vertical axis of FIG. 2 represents the maximum number of new p-SNCs that can be deployed for any given p-SNC reconfiguration ratio. The apparent non-linear relationship of this graph around 10% p-SNC ratio is indeed a widespread attribute of mature DWDM networks. In this example, to deploy 17 new p-SNCs, this network operator can determine that the p-SNC reconfiguration ratio must be at least 10%. This aspect, as well as the overall negative exponential form of the ratio of p-SNC reconfiguration to optimized wavelength count, provides an ability to trade-off deterministically the number of p-SNCs to reconfigure to maximize return and minimize cost. In most real-world applications the sweetspot of partial reconfiguration is likely to be between as little as 5% and, with high confidence of maximum benefit, 30%. In addition to ensuring a capacity gain to admit new p-SNCs, the relationships of FIG. 2 may be employed advantageously to several other strategies: the free and optimal selection of the p-SNCs to reconfigure for a given percentage in order to minimize the wavelength count overall, and/or also minimize the reconfiguration steps, and/or admit a certain number of or maximize new p-SNCs; to goal seek which percentage is optimal that balances reduction in wavelength count or maximizes new p-SNC count overall against the impact of reconfiguration; or for a specific subset of p-SNCs or for the p-SNCs carried by any specified subset of network nodes, links or paths, the optimum selection to reconfigure to minimize that wavelength count, and/or also minimize the reconfiguration steps, and/or maximize the new p-SNC count. Note that the proposed optimization is not limited to objective cost function metrics of wavelength count, reconfiguration steps, or newly admissible p-SNC count; any number or combination of other performance metrics may be employed. One preferred example is to use projected layer 0 traffic growth and apply partial optimization to ensure that the number of new p-SNCs admissible in the network is maximized and distributed in direct proportion to those growth regions. Another practical example is to apply constraints, such as only using alternative paths based on their optical reachability that accounts for optical budget as well as fill.

Table 1 below shows by example a further principle of not only selecting the percentage of p-SNCs by the impact on wavelength count but also by the actual cost of implementation. Specifically, Table 1 lists steps, the p-SNC addressed at each step by its associated ID, the new route at each step and wavelength. Where 5 p-SNCs need to be reconfigured, it seems prima facie that 8 steps are required to do so. This is because p-SNC #1, 3 and 8 need to be deployed on a temporary wavelength before they can be configured on their final wavelength. Taking for example p-SNC ID #1, its new route is on links 6 and 2, and the new channel #, or color, is 33. Since p-SNC ID #3 is already using color 33 and shares on its current route link #2 with p-SNC ID #1 new route, a temporary channel #, in this case channel #88, needs to be assigned to p-SNC #1.

TABLE 1 p-SNCs Re-configuration steps without optimization.

| Step # | p-SNC ID | Current Route (Channel #) | New Route (Channel #) |
|---|---|---|---|
| 1 | 1 | 12-15-4 (17) | 6-2 (88) |
| 2 | 5 | 4-3-10-12 (13) | 5-6-1 (6) |
| 3 | 3 | 1-2-8 (33) | 10-3-5 (88) |
| 4 | 1 | 6-2 (88) | 6-2 (33) |
| 5 | 8 | 3-5 (41) | 7-9 (88) |
| 6 | 3 | 10-3-5 (88) | 10-3-5 (41) |
| 7 | 12 | 11-7-9 (26) | 10-6-3 (19) |
| 8 | 8 | 7-9 (88) | 7-9 (26) |

In addition to partial optimization, the systems and methods determine an optimal ordering of reconfiguration of the p-SNCs. Table 2 shows that the same reconfiguration goal as Table 1 can be achieved in 5 steps by sequencing the p-SNCs differently This simple example illustrates the fact that the proposed approach allows reducing the number of implementation steps, making the reconfiguration less costly and faster to execute.

TABLE 2 p-SNCs Re-configuration steps with optimization.

| Step # | p-SNC ID | Current Route (Channel #) | New Route (Channel #) |
|---|---|---|---|
| 1 | 12 | 11-7-9 (26) | 10-6-3 (19) |
| 2 | 8 | 3-5 (41) | 7-9 (26) |
| 3 | 3 | 1-2-8 (33) | 10-3-5 (41) |
| 4 | 1 | 12-15-4 (17) | 6-2 (33) |
| 5 | 5 | 4-3-10-12 (13) | 5-6-1 (6) |

Table 3 provides an overview of the staged set of objectives of partial optimization, the selected optimization algorithm families, and their judicious combination and further extension and tailoring to achieve the goals of the partial optimization.

TABLE 3 p-SNCs Re-configuration steps with optimization.

| Stage | Objective | Algorithm Family | Extension and tailoring |
|---|---|---|---|
| 1 | Partial routing of p-SNCs | Integer Linear Programming | Problem formulation and objective function |
| | Partial routing of p-SNCs | Genetic Algorithm | Problem model and objective function |
| | Partial graph coloring (partial wavelength assignment) | Tabu Search | Algorithm implementation |
| 2 | Ordering of the p-SNCs | Genetic Algorithm | Problem model |
| | Ordering of the p-SNCs | Simulated Annealing | Problem model |

Figure 3:
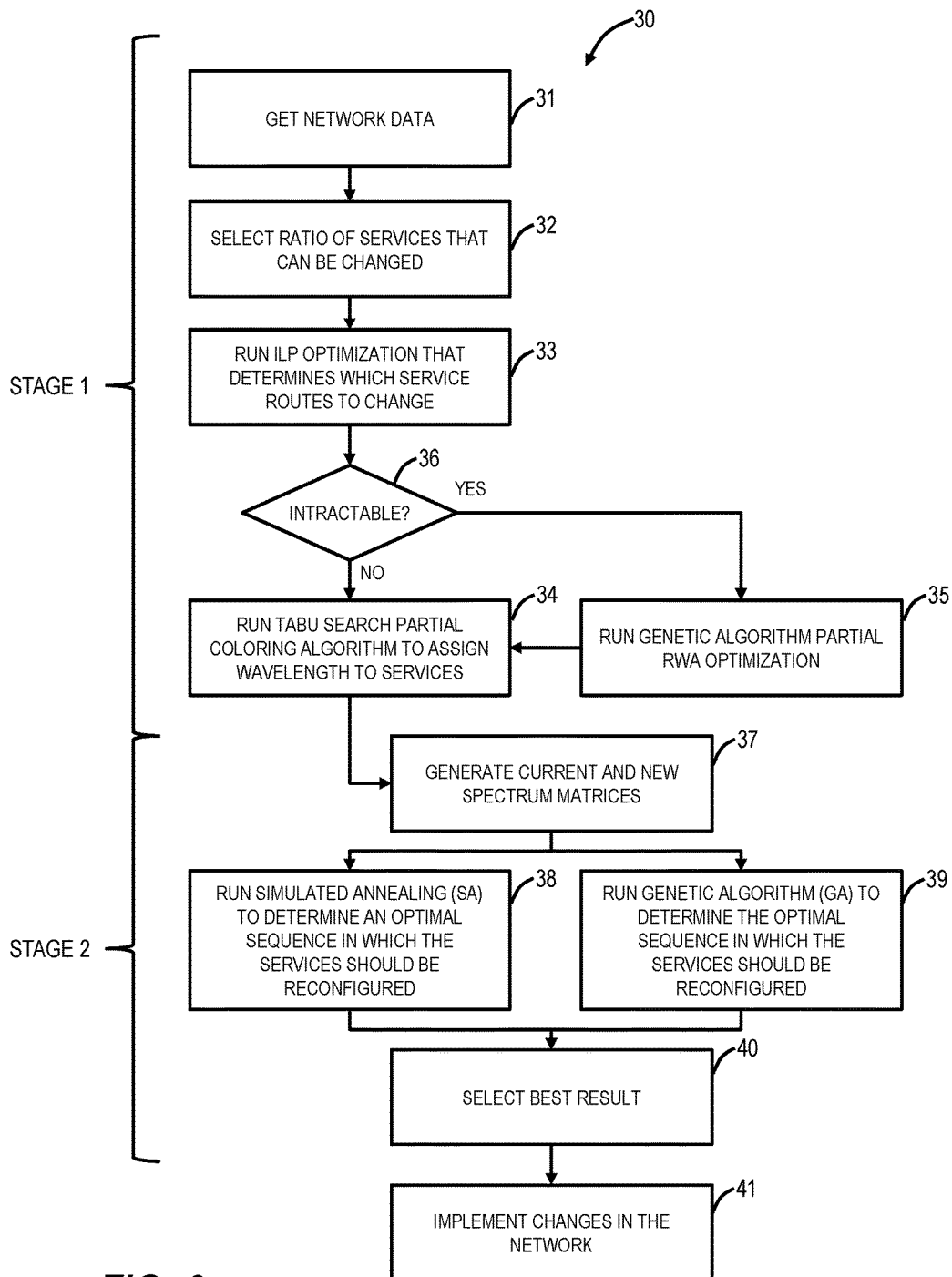
FIG. 3 is a flowchart of a partial optimization process.

FIG. 3 is a flowchart of a partial optimization process 30. The partial optimization process 30 can be divided into two main stages (labeled as stage 1 and stage 2 in FIG. 3). The partial optimization process 30 would be implemented on a server or the like such as one of the servers 16. The partial optimization process 30 gets network topology and any other data necessary for optimization purposes (step 31).

The partial optimization process 30 is performed on the optical network 10 which has existing connections (p-SNCs) with routing and wavelength assignments. The goal is to minimize the number of wavelengths and resources used, by determining (1) the fewest routing and wavelength assignment changes that will maximise the return or the optimal set for a given proportion of connections, (2) which connections should be changed, and (3) the order in which they should be changed to avoid resource collision during the state transition.

The partial optimization process 30 is a two-stage process which for a first stage determines, for a given proportion of connections, the attainable reduction in a number of wavelengths, and for a second stage determines the order of changes that minimize conflicts. It should be noted that conflicts may refer to immediate conflicts with other wavelength assignments at layer 0, and/or consideration of impact of reconfiguration at higher network layers. For example, wavelengths which may be supporting priority services at higher layers such as working paths, or indeed protection paths which may be considered either higher or lower priority, may be inferred at layer 0 to distinguish which wavelengths are more vital than others on which to minimise disruption. This aspect may also be used as part of the optimisation objective function. There is a conflict when a wavelength to be changed is already used in the layer 0 network thereby requiring a temporary wavelength. The partial optimization process 30 can also iterate between the two stages to trade maximum return for a given number of steps, with a goal to seek the most efficient proportion based on a combined cost of wavelength and step counts.

Stage 1 includes, for any given percentage of p-SNCs which are provided/selected (step 32), identification of the best candidate connections that through optimizing their route (step 33 or step 35) and wavelength assignment (step 34), minimizes the overall wavelength count. A preferred approach uses a custom Integer Linear Programming (ILP) process for selecting the optimal routes (step 33) combined with a Tabu Search (TS) meta-heuristic process for wavelength assignment (step 34). The use of the ILP combined with TS allows performing partial reconfiguration on very large DWDM networks, including hundreds of links and nodes. However, in some instances where the demand (connection) matrix (an N×N matrix representing the number of p-SNCs between node pairs, where N is the number of nodes) is very dense, the ILP may become intractable (step 36). In these cases, a genetic algorithm (GA) meta-heuristic process (step 35) is alternatively used to the ILP functionality, and combined with the TS.

Subsequent to stage 1, the partial optimization process 30 stage 2 includes generating current spectrum and new spectrum matrices (step 37). The matrices define what the route and wavelength assignments are currently and what the route and wavelength assignments should be based on the first stage of the partial optimization process 30. Once the new routes and wavelengths of any given percentage of p-SNCs to be reconfigured are determined, a dual parallel meta-heuristic optimization strategy (steps 38, 39) identifies the optimal sequence in which these p-SNCs should be reconfigured, to minimize the number of deployment steps. Step 38 is a Simulated Annealing (SA) algorithm which is run to determine an optimal sequence in which the p-SNCs in the matrices should be reconfigured. Step 39 is a Genetic Algorithm (GA) which is run also to determine an optimal sequence in which the p-SNCs in the matrices should be reconfigured. The use of both the SA and GA processes ensures that the search space is widely covered and that the best result is obtained.

The best result is selected, such as the one with the minimum steps (step 40). Other criteria can also be considered, such as the minimum number of temporary wavelengths, etc. Finally, the partial optimization process 30, after the two stages, can cause implementation of the changes (from the best result) in the network 10 (step 41).

Integer Linear Programming (ILP) Process

In the first stage, the objective of the ILP process is to determine, for a given ratio of connections, the attainable reduction in a number of wavelengths. The following describes an example process, such as for step 33 in the partial optimization process 30. Let the following denote indices:

e=1, 2, . . . , E links
d=1, 2, . . . , D demands (connections)
p=1, 2, . . . , P paths (pre-computed)
c=1, 2, . . . , C colors (for example from 1 to 88)
where links are the links 14 in the optical network, demands are the p-SNCs, paths define the A-Z connectivity of the p-SNCs, and colors represent the wavelengths or spectrum which in this example is assumed to be 88 fixed grid wavelengths, although other grids are possible as well as mixed grids—i.e. links 14 with different grids.

Let the following denote parameters:
$u_{edp}$=1 if link e is used for demand d on path p; 0, otherwise (pre-computed)
$W_d$ is the number of wavelengths needed to satisfy demand d
$A_{dp}$=1 if path p is chosen for demand d; 0, otherwise. Applies to the current routing of the network
R is the allowed ratio of connections that can be changed (those that are reconfigured)

Let the following variables:
$C_e$ congestion (p-SNC utilisation) on link e
$C_N$ maximum network congestion—see definition below
$L_e$=1 if maximum network congestion is currently on link e
$B_{dp}$=1 if path p is chosen for demand d; 0, otherwise. Applies to any new routing in the network The ILP process for reassigning all wavelengths uses the following objective function:

$$\text{minimize } F = M_1 C_N + M_2 \sum_e L_e + M_3 \sum_e C_e,$$

where M1>>M2>>M3 to minimize maximum network congestion, the number of links with maximum network congestion, and the overall sum of all link congestion. The following are constraints:

$$\sum_p B_{dp} = 1 \ \forall \ d$$

one path must be chosen by demand $$\sum_d \sum_p A_{dp} B_{dp} \leq (1 - R)$$

*NbDemands/100 only a certain amount of demands can be changed $$C_e = \sum_d \sum_p u_{edp} B_{dp} W_d \ \forall \ e$$

congestion on link e corresopnds to the sum of it lighpaths
$C_N \geq C_e$ ∀e network congestion $C_N$ corresponds to the max link congestion
$C_N - C_e \ L_e \geq 1$ ∀e $L_e$ equals 1 if maximum congestion on link e The ILP process for reassigning a partial number of wavelengths uses the following objective function:

$$\text{minimize } F = M_1 C_N + M_2 \sum_e L_e + M_3 \sum_e C_e + M_4 \sum_c X_c,$$

where $M_4 \gg M_1 \gg M_2 \gg M_3$ to minimize maximum network congestion, the number of links with maximum network congestion, the overall sum of all link congestion and the number of colors (wavelengths, spectrum) used by the unchanged demands. Maximum Network congestion is defined to be the maximum number of p-SNCs that are carried within a single link, for any given link in the network. By minimizing the maximum network congestion, the number of links that have this maximum congestion value and the overall link congestion (the sum of all link congestion), an optimal routing assignment is achieved, one that will subsequently result in an optimal color (wavelength) assignment. For partial reconfiguration, the lower bound on the network wavelength count is given by the total number of colors used by the services that are not reconfigured (that do not change). The fourth term in the objective function allows to minimize the number of colors of the unchanged demand and therefore the network wavelength count after reconfiguration.

Figure 4A:
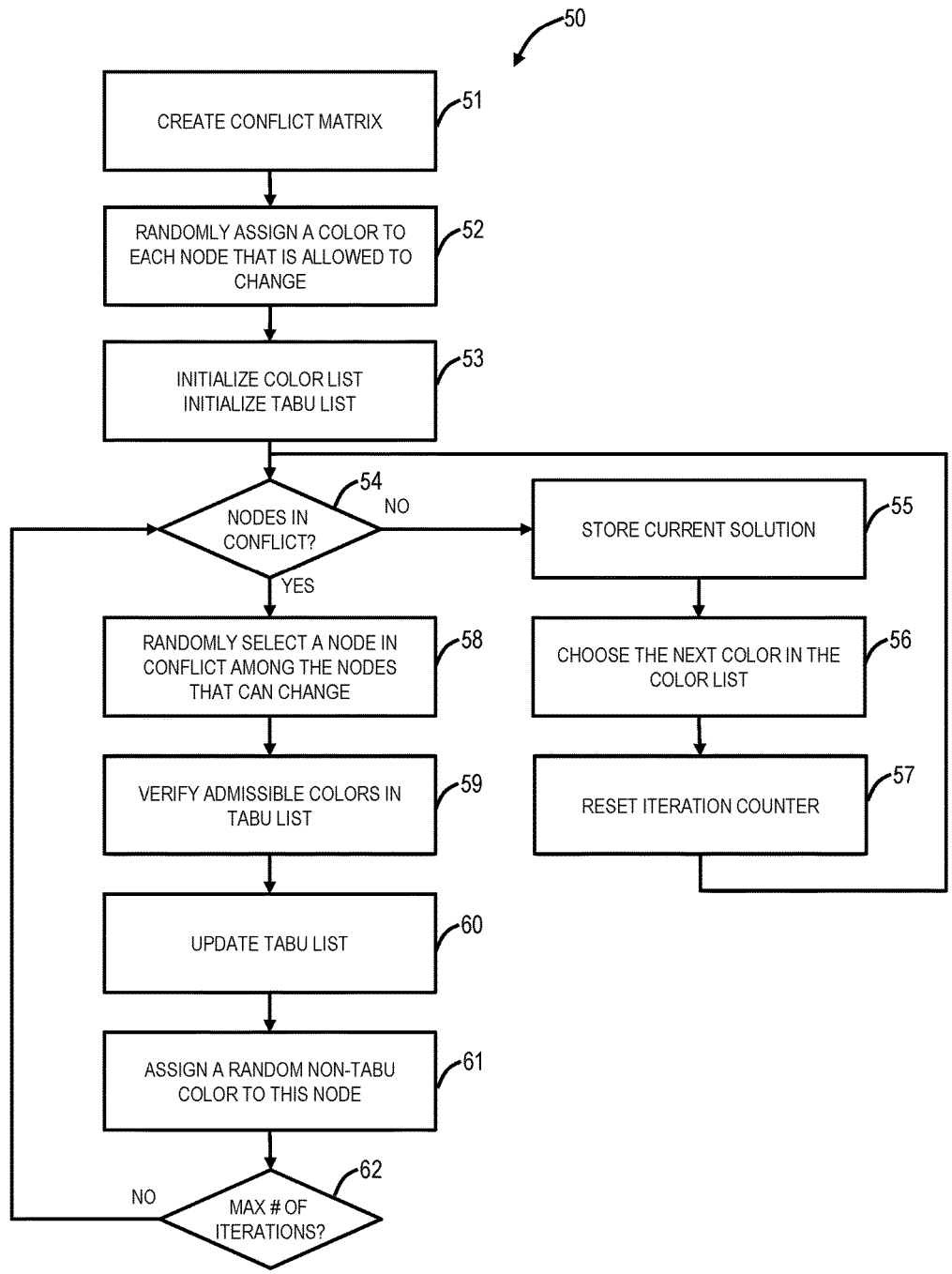
FIG. 4A is a flowchart of a modified Tabu search process for partial graph coloring for the partial optimization process of FIG. 3.
Figure 4B:
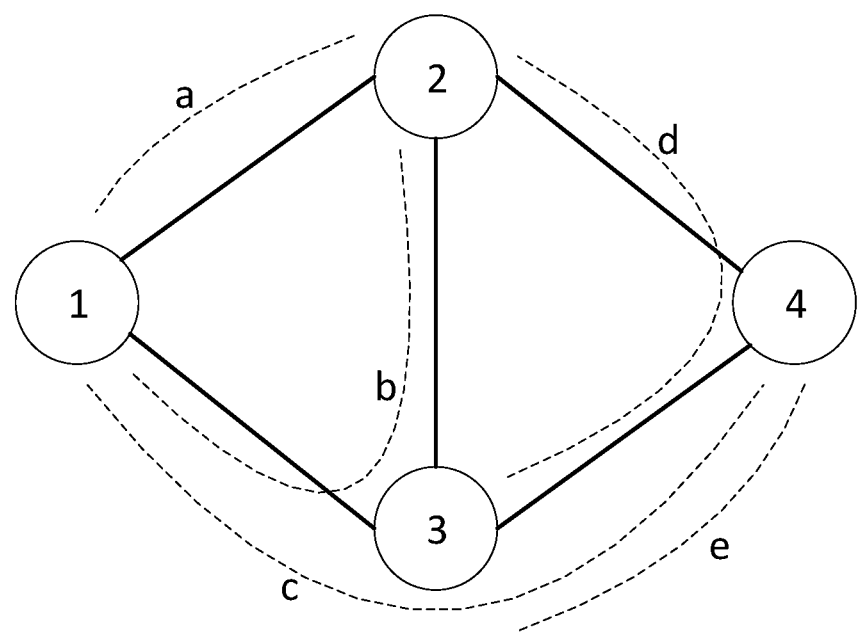
FIG. 4B is a network diagram of an example four node, five link network for a Tabu search, and a depiction of its conflict graph.
Figure 4B:
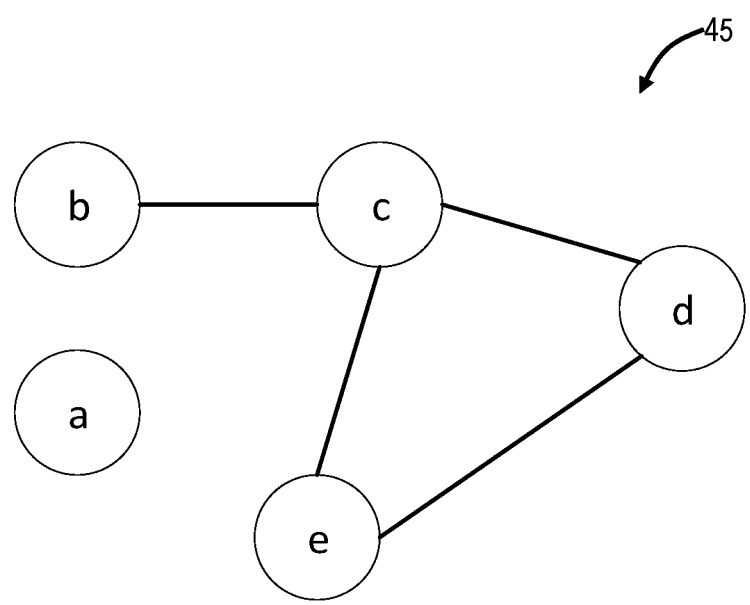

The following are constraints:

$$\sum_d \sum_p A_{dp} B_{dp} = u_d \ \forall \ d$$

binary variable indicating if a demand is allowed to change $\delta_{dc} = \lambda_{dc} u_d$ ∀d, c—corresponds to the current wavelengths,_dc is used internally and corresponds to 0 if a demand is allowed to change so it won't be considered in the minimization. $X_c \geq \delta_{dc}$ ∀d, c a color is being used if an unchangeed demand is using this color Tabu Search FIG. 4A is a flowchart of a Tabu search process 50 developed specifically for partial graph coloring for the partial optimization process 30. Specifically, the Tabu search process 50 provides details of step 34 in the partial optimization process 30. A Tabu search is a meta-heuristic search approach employing local search processes used for mathematical optimization. Local (neighborhood) searches take any potential solution to a problem and check its immediate neighbors (that is, solutions that are similar except for very few minor details) in the hope of finding an improved solution. Local search processes have a tendency to become stuck in suboptimal regions or on plateaus where many solutions are equally fit. FIG. 4B is a network diagram of an example four node, five link network for a Tabu search.

The input to the Tabu search algorithm is the p-SNCs route allocation provided by either the ILP 33 or the genetic algorithm 35. From this route assignment, a conflict matrix, or conflict graph, is generated. The nodes in this graph represent the connections (p-SNCs). A link between two nodes indicate that the route of these two SNCs share a common fiber segment. Therefore, due to the distinct wavelength constraint, any pair of nodes that are connected in the conflict graph needs to be assigned a different color, or wavelength. For example, consider the following network with 4 nodes, and 5 fiber links in FIG. 4B. Five p-SNCs are represented: a) From node 1 to node 2, b) From node 1 to node 2, c) From node 1 to node 4, d) From node 2 to node 3, and e) From node 3 to node 4.

For this network, a conflict graph 45 is illustrated in FIG. 4B. Since there are 5 p-SNCs in the network, the conflict graph 45 has 5 nodes. As illustrated in FIG. 4B, p-SNC (b) shares a link with p-SNC (c). Therefore, in the conflict graph, a link exists between node (b) and (c). This indicates that the color (wavelength) of node (p-SNC) (b) needs to be different from the color of node (c). p-SNC (a) does not share any link with other p-SNCs which explains the absence of connection for this node in the conflict graph.

The objective of the graph coloring algorithm is to assign a color to each node of the conflict graph, so that no adjacent node has the same color, and to minimize the overall number of colors, thereby minimizing the overall number of wavelengths in the network. In a newly designed network, the colors of all nodes of the conflict graph are allowed to change. For partial reconfiguration, only certain nodes are allowed to change, those that correspond to p-SNCs that are reconfigured, versus the p-SNCs that remain unchanged.

For the consequential partial graph coloring, a color list needs to be initialized. The color list represents the order in which the colors are eliminated by each iteration of the coloring algorithm and is obtained by concatenating the list of unused colors (wavelengths available) and the list of colors used by the connections that do not change (fixed p-SNCs). The following is an example of a color list:

| 88, 87, 86, . . . , 12, 11, 9, 5 | 10, 8, 7, 6, 4, 3, 2, 1 |
|---|---|
| Unused colors | Colors used by fixed p-SNCs |

At each iteration, the Tabu search coloring algorithm attempts to color the conflict graph using one of the available colors in the color list in turn. If successful, the used item of the color list is removed and the graph coloring is performed again, until no colors can be removed from the list. At this point, the number of colors is minimized, corresponding to an optimal wavelength assignment. The Tabu list represents a record of the list of moves (change of node colors) that were recently tried by the coloring algorithm and that are currently forbidden (tabu in Tongan dialect, or taboo in English). This forces the heuristic to explore in more depth the design space and increases the probability of finding a global optimum. Note that the Tabu list is of the type first-in, last-out, and is updated at each iteration. It takes the following form:

| Node | Tabu Color |
|---|---|
| 4 | 5 |
| 3 | 4 |
| 2 | 2 |
| 2 | 3 |
| 3 | 9 |
| 5 | 8 |
| 1 | 9 |

The length of the Tabu list is fixed and needs to be set to provide the best optimization results for realistic network sizes. In one preferred embodiment the length of the list for partial optimization is 20, allowing the search process to explore a wide area of the design space, without compromising computational time performance.

The Tabu search process 50 begins creating a conflict matrix (step 51), randomly assigning a color to each node (step 52), and initializing a color and a Tabu list (step 53). Then, the Tabu search process 50 iterates checking if there are nodes in conflict in the conflict matrix (step 54). If there is no conflict, the Tabu search process 50 includes storing the current solution (step 55), decreasing the number of colors (step 56), and resetting an iteration counter (step 57). If there are nodes in conflict, the Tabu search process 50 includes randomly selecting a node in conflict (step 58), verifying admissible colors in the Tabu list (step 59), updating the Tabu list (step 60), and assigning a random non-Tabu color to this node (step 61). The Tabu search process 50 checks if the maximum number of iterations has been reached (step 62), and if not, returns to step 54. If so, the Tabu search process 50 can end. The output of the Tabu search partial coloring algorithm is the wavelength assignment of all the re-configured p-SNCs.

Genetic Algorithm

Figure 5:
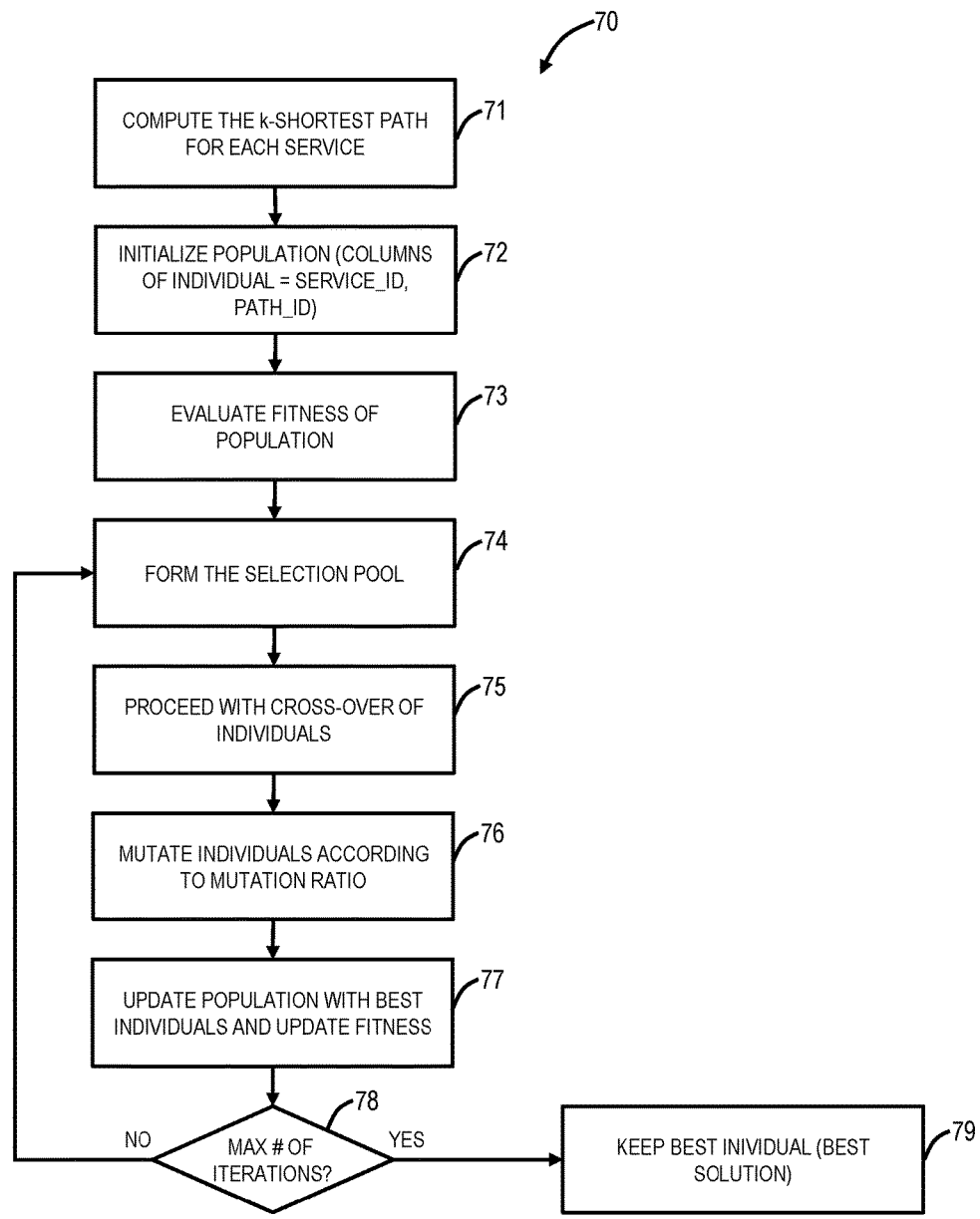
FIG. 5 is a flowchart of a genetic algorithm for the partial optimization process.

FIG. 5 is a flowchart of a genetic algorithm 70 the partial optimization process 30. Specifically, the genetic algorithm 70 provides details of step 35 in the partial optimization process 30. The genetic algorithm 70 includes computing k-shortest paths for each service (p-SNC) (step 71), initializing a population (step 72), and evaluating the fitness of the population (step 73). The population is a set of individuals, each representing a potential solution and is represented by a multi-dimensional matrix. This matrix has as many rows as there are p-SNCs to be reconfigured, two columns representing respectively the p-SNC ID and the chosen path (among the k precomputed paths), and as many dimensions as there are individuals. The genetic algorithm 70 iterates by forming a selection pool (step 74), proceeding with cross-over individuals (step 75), mutating individuals according to a mutation ratio (step 76), and updating the population with the best individuals and updating the fitness (step 77). The fitness function is expressed as follows:

$$\min - M_1 R + M_2 C + M_3 N + M_4 L + M_5 O$$

where R is the ratio between the unique p-SNCs selected by the GA and the allowed number of reconfigured p-SNCs, C is the number of colors used by the p-SNCs that don't change, N is the maximum network congestion, L is the number of links with the maximum congestion, and O is the overall link congestion. Due to the cross-over and mutation operations, the same p-SNC can appear more than once in a given individual (a given potential solution). The first term of the fitness function (R) assures that the final solution is formed of unique p-SNCs. Similarly to the ILP, terms 2 to 5 allow to obtain the best routing assignment for partial reconfiguration, one that results in an optimal wavelength assignment and that minimizes the overall wavelength count in the network. The weighting factor of each objective ($M_{1-5}$) is chosen so that the genetic algorithm explores as much as possible the design space, without compromising its run-time performance.

The genetic algorithm 70 checks if a maximum number of iterations has been reached (step 78), and if not, returns to step 74. If so, the genetic algorithm 70 ends keeping the best individual (best solution) (step 79). The overall objective of the genetic algorithm is to select the p-SNCs that are allowed to be reconfigured and their chosen path, among the k precomputed paths. This is done as to minimize the number of wavelengths of the p-SNCs that don't change and the congestion in the network. The output of the GA is an optimized partial routing assignment.

Metaheuristic for Stage Two

Figure 6:
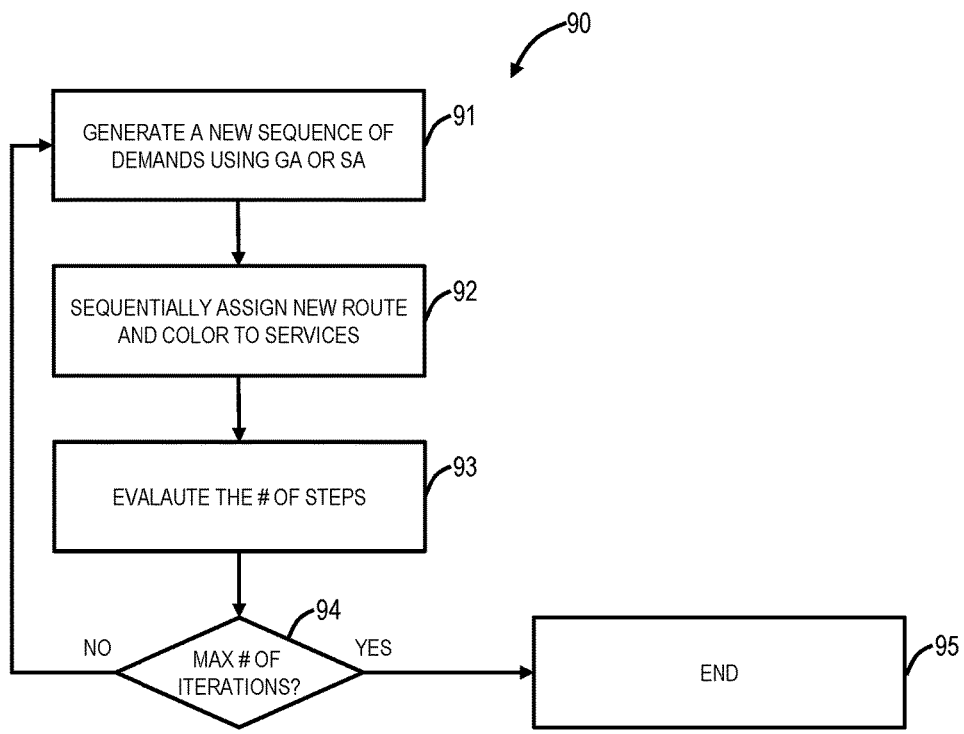
FIG. 6 is a flowchart for a process for determining a sequence of changes to minimize conflicts for the partial optimization process.

FIG. 6 is a flowchart for a process 90 for determining a sequence of changes to minimize conflicts for the partial optimization process 30. Specifically, the process 90 provides details of either and both steps 38, 39 in the partial optimization process 30. Again, the output of the first stage of the partial optimization process 30 is a current spectrum matrix (current routing and wavelength assignments in the network) and a new spectrum matrix (routing and wavelength assignments after implementing all of the changes from the first stage). The goal of the process 90 is to find the optimal sequence of changing from the current spectrum matrix to the new spectrum matrix. Again, step 38 is the Simulated Annealing (SA) which is run to determine an optimal sequence in which the p-SNCs in the matrices should be reconfigured. Step 39 is a Genetic Algorithm (GA) which is run also to determine an optimal sequence in which the p-SNCs in the matrices should be reconfigured. For both the SA and GA, the objective function is to reduce the number of steps to implement the reconfiguration. The parameters of the SA (initial temperature, temperature reduction rate, maximum number of iterations) and the GA (population size, mutation ratio, maximum number of iterations) are adjusted for the best compromise between performance and run-time.

The process 90 includes generating a new sequence of demands using GA or SA (step 91), sequentially assigning a new route and color to the services (step 92), evaluating a number of steps (step 93), and checking if the maximum number of iterations has been reached (step 94), and if not, returning to step 91. If the maximum number of iterations has been reached, the process 90 can end keeping the best solution considered (step 95).

Figure 7:
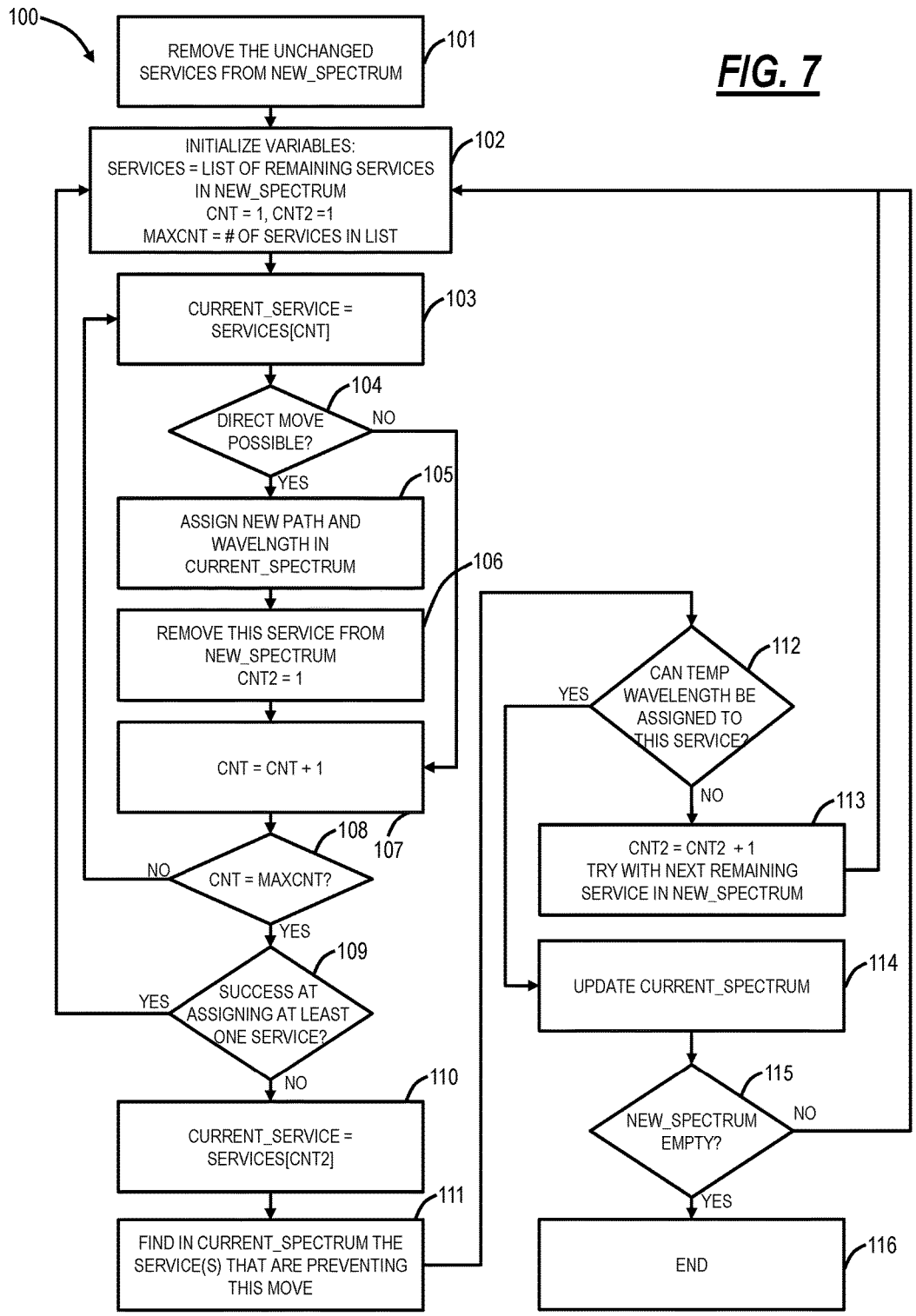
FIG. 7 is a flowchart of a sequential assignment process for use in the process of FIG. 6.

FIG. 7 is a flowchart of a sequential assignment process 100 for use in the process 90. Specifically, the sequential assignment process 100 provides details for step 92 in the process 90 for p-SNC step by step reconfiguration. The sequential assignment process 100 utilizes the current spectrum matrix and the new spectrum matrix. The sequential assignment process 100 includes removing the unchanged services from the new spectrum matrix (step 101), i.e., there is no need to assign changes to unchanged services.

The sequential assignment process 100 initializes variables—services=list of remaining services in the new spectrum matrix, cnt=1, cnt2=1, and a maxcnt=the number of services in the list (step 102). The current service is set to the services[cnt] (step 103), and it is determined if a direct move is possible (step 104). A direct move means the service[cnt] can be moved directly to its new route and wavelength without a temporary wavelength, i.e., the new wavelength is unoccupied. If the direct move is possible, the service[cnt] is assigned a new path and wavelength in the current spectrum matrix (step 105). The service[cnt] is removed from the new spectrum matrix and cnt2 is set to 1 (step 106) and cnt is set to cnt+1 (step 107).

If the direct move is not possible (step 104), the sequential assignment process 100 moves to step 107. After step 107, the sequential assignment process 100 includes checking if cnt=maxcnt (step 108), and, if not, the sequential assignment process 100 moves to step 103. If cnt=maxcnt (step 108), The sequential assignment process 100 includes checking if there is a success in assigning at least one service (step 109), and, if so, the sequential assignment process 100 includes moving to step 102. If not, the sequential assignment process 100 includes setting the current service=service[cnt2] (step 110). The sequential assignment process 100 including finding the service(s) in the current spectrum matrix that is preventing the move (step 111) and whether a temporary wavelength can be assigned to this service (step 112). If a temporary wavelength cannot be assigned, the sequential assignment process 100 includes setting cnt2=cnt2+1 and trying the next remaining services in the new spectrum (step 113) and moving to step 102.

If the temporary wavelength can be assigned (step 112), the sequential assignment process 100 includes updating the current spectrum (step 114) and checking if the new spectrum is empty (step 115). If the new spectrum is empty (i.e. all p-SNCs have been reconfigured), the sequential assignment process 100 ends (step 115), and if the new spectrum is not empty, the sequential assignment process 100 moves to step 102. Note that while only temporary wavelengths assignment is described by process 100, temporary route allocation may also be performed.

Operational Examples

The partial optimization process 30 was implemented on four example networks, referred to as networks 1, 2, 3, 4. These networks have the following characteristics in Table 4.

TABLE 4

Network topologies.

| Name | # nodes (ROADM) | # links | Total # of p-SNCs | Wavelength Count | Topology |
|---|---|---|---|---|---|
| Network 1 | 14 | 20 | 91 | 24 | Interconnected mesh |
| Network 2 | 21 | 38 | 210 | 35 | Interconnected mesh |
| Network 3 | 24 | 47 | 276 | 54 | Interconnected mesh |
| Network 4 | 543 | 437 | 702 | 52 | Interconnected mesh |

Table 5 shows the results of the first stage of the partial optimization process 30, which for each considered p-SNC ratio, shows the minimum wavelength count that can be attained across all the p-SNCs of the network (table 4). For each network, the performance of the ILP-TS algorithm and GA-TS approach is provided. A p-SNC ratio of 0% corresponds to the current state of the network, while a p-SNC ratio of 100% is equivalent to reconfiguring all p-SNCs.

For the networks 1, 2, 3, the GA-TS approach is either as good or better than the ILP-TS approach, as the remaining wavelength count is lower. For the network 4, both approaches perform almost equally well. Note that the ILP for the networks 2, 3 becomes intractable for a p-SNC ratio of 40%. This is explained by the fact that the demand matrix for these two networks is very dense since p-SNCs are being deployed for each possible node pair combinations in the network.

By way of example for stage 2 of the partial optimization process 30, a network reconfiguration of a 5th nationwide network demonstrates its effectiveness. For this example, 443 p-SNCs were selected to be reconfigured, corresponding to all the p-SNCs in the network. Without any optimization, 472 steps are required to implement the reconfiguration. This is caused by the fact that temporary wavelengths need to be assigned to some p-SNCs before they can be deployed on their final wavelength. By optimally ordering the sequence in which the p-SNCs are deployed, the proposed methods of stage 2 reduced the number of steps to 460. In practice this would have the benefits of minimizing the number of maintenance windows, disruption of services and implementation costs.

Trade-Off in Percentages

The partial optimization process 30 includes a process that periodically and automatically determines the ratio of p-SNC to change, not just by considering the wavelength count or the newly admissible p-SNC count, but also the number of steps needed when implementing the solution (stage 2). For example, if 10% of the p-SNCs need to be changed to attain a wavelength count of 68, the process could instead suggest changing 12%, while still reducing the wavelength count to at least 68, but significantly reducing the number of steps at stage 2. Indeed, a lower percentage may also attain desirable goals when the number of implementation steps is also taken into account. The partial optimization process 30 is thus able to goal seek the most efficient proportion of p-SNCs based on a combined cost of wavelength and step counts.

The objective here is to provide meaningful information to a network operator. Specifically, the partial optimization process 30 has inputs which constrain the optimization such as the ratio (which limits the number of services that can be changed), the reduction of wavelength count, and the total number of steps. In the examples described herein, the ratio is described as the variable. However, the partial optimization process 30 can be employed such that reduction of wavelength count and/or the total number of steps is the selected variable with the ratio being the output. For example, assume the network operator sets the ratio at 10% to obtain a reduction of X wavelengths. However, a ratio of 12% may have the same number of steps, but obtains a reduction of X+Y wavelengths. This tradeoff is achieved by invoking stage 1 and stage 2 of process 30 (iteratively or simultaneously) for different ratios of reconfigured services, and by recording for each ratio, the network wavelength count, the provisional service count, the number of steps of the reconfiguration, and any other performance metric. Either an automatic process (further optimization) or manu-

TABLE 5

Attainable wavelength count for different p-SNCs ratio.

| p-SNC Ratio [%] | Network 1 | | Network 2 | | Network 3 | | Network 4 | |
|---|---|---|---|---|---|---|---|---|
| | ILP-TS | GA-TS | ILP-TS | GA-TS | ILP-TS | GA-TS | ILP-TS | GA-TS |
| 0 | 24 | 24 | 35 | 35 | 54 | 54 | 52 | 52 |
| 5 | 22 | 22 | 34 | 34 | 53 | 50 | 48 | 48 |
| 10 | 21 | 21 | 33 | 31 | 48 | 46 | 45 | 45 |
| 15 | 20 | 20 | 30 | 29 | 44 | 44 | 42 | 42 |
| 20 | 20 | 20 | 29 | 27 | 43 | 42 | 40 | 41 |
| 30 | 19 | 19 | 25 | 25 | 43 | 41 | 38 | 38 |
| 40 | 19 | 19 | — | 24 | — | 41 | 38 | 38 |
| 100 | 13 | 13 | 19 | 19 | 40 | 40 | 28 | 28 | ally the network operator can evaluate the best compromise between the cost and the performance of the reconfiguration exercise.

Server

Figure 8:
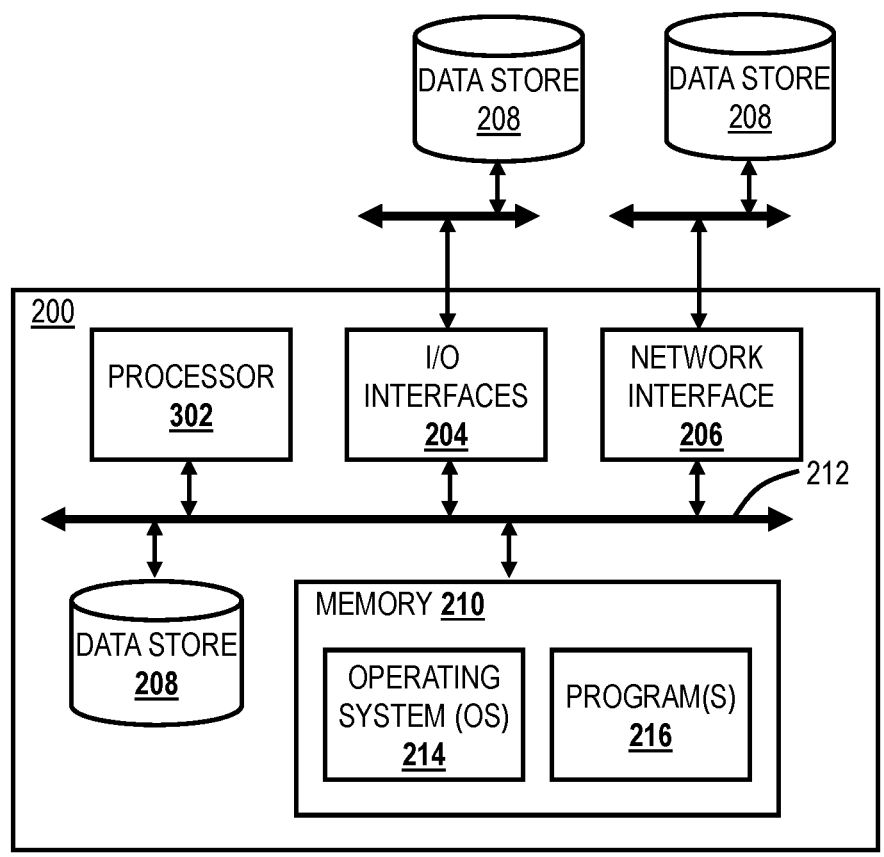
FIG. 8 is a block diagram of a server to perform the partial optimization process of FIG. 3.

FIG. 8 is a block diagram of a server 200 such as for the servers 16, for a processing device to implement the control plane 18, for an SDN controller, a PCE, a planning tool, etc. to perform the partial optimization process 30. The server 200 can be a digital computer that, in terms of hardware architecture, generally includes a processor 202, input/output (I/O) interfaces 204, a network interface 206, a data store 208, and memory 210. It should be appreciated by those of ordinary skill in the art that FIG. 8 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 can be used to receive user input from and/or for providing system output to one or more devices or components. User input can be provided via, for example, a keyboard, touchpad, and/or a mouse. System output can be provided via a display device and a printer (not shown). I/O interfaces 204 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 can be used to enable the server 200 to communicate on a network. The network interface 206 can include, for example, an Ethernet card or adapter or a wireless local area network (WLAN) card or adapter. The network interface 206 can include address, control, and/or data connections to enable appropriate communications on the network. A data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the server 200 such as, for example, an internal hard drive connected to the local interface 212 in the server 200. Additionally, in another embodiment, the data store 208 can be located external to the server 200 such as, for example, an external hard drive connected to the I/O interfaces 204 (e.g., SCSI or USB connection). In a further embodiment, the data store 208 can be connected to the server 200 through a network, such as, for example, a network attached file server.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 can incorporate electronic, magnetic, optical, and/or other types of storage media. Note that the memory 210 can have a distributed architecture, where various components are situated remotely from one another but can be accessed by the processor 202. The software in memory 210 can include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

While discussion has centered on wavelength division and allocation of optical spectrum, one of ordinary skill in the art will appreciate that the methods of this disclosure are equally applicable to partial optimization of any network technology and connection oriented layer reliant on the division of a frequency and/or time domain, wherein it is desirable to retain divisional positions in that frequency and/or time domain for each respective connection along its entire path between termination points. Such networks are typically those for which changing positions in the frequency or time domains mid-connection involves introducing switching functions, that incurs a cost and/or performance penalty.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A partial optimization method of wavelengths or spectrum in an optical network, the partial optimization method comprises:
   based on current services in the optical network each having a route and wavelength or spectrum assignment and based on a proportion of services, performing a first stage optimization to determine which of the current services are changed for one or more of the route and the wavelength or spectrum assignment to attain a measurable advantage;
   performing a second stage optimization to determine an order of implementing changes from the first stage optimization with that order minimizing one or more of conflicts and step counts;
   performing a plurality of the first stage optimization and the second stage optimization with different values of the ratio of services;
   providing an output of the different values of the ratio of services and corresponding wavelength reduction and step count; and
   causing implementation of the changes selected from the different values in the optical network based on the order to affect the measurable advantage.

2. The partial optimization method of claim 1, wherein the first stage optimization utilizes Integer Linear Programming to minimize an objective function to select routes for which of the current services to change.

3. The partial optimization method of claim 2, wherein the first stage optimization utilizes a Tabu search to determine wavelength assignment.

4. The partial optimization method of claim 3, wherein, responsive to the Integer Linear Programming being intractable, the first stage optimization utilizes a genetic algorithm to determine wavelength assignment.

5. The partial optimization method of claim 1, wherein the second stage optimization utilizes dual, parallel heuristic optimization to minimize the step counts.

6. The partial optimization method of claim 5, wherein the dual, parallel heuristic optimization comprises a genetic algorithm and a simulated annealing process.

7. A server configured to perform a partial optimization of wavelengths or spectrum in an optical network, the server comprising:
   a processor; and
   memory storing instructions that, when executed, cause the processor to
      based on current services in the optical network each having a route and wavelength assignment and based on a proportion of services that can be changed in the partial optimization, perform a first stage optimization to determine which of the current services are changed for one or more of the route and the wavelength assignment to attain a measurable advantage,
      perform a second stage optimization to determine an order of implementing changes from the first stage optimization that with the order minimizing one or more of conflicts and step counts,
      perform a plurality of the first stage optimization and the second stage optimization with different values of the ratio of services,
      provide an output of the different values of the ratio of services and corresponding wavelength reduction and step count, and
      cause implementation of the changes selected from the different values in the optical network based on the order to affect the measurable advantage.

8. The server of claim 7, wherein the first stage optimization utilizes Integer Linear Programming to minimize an objective function to select routes for which of the current services to change.

9. The server of claim 8, wherein the first stage optimization utilizes a Tabu search to determine wavelength assignment.

10. The server of claim 9, wherein, responsive to the Integer Linear Programming being intractable, the first stage optimization utilizes a genetic algorithm to determine the reconfigurable p-SNCs and their route assignment.

11. The server of claim 7, wherein the second stage optimization utilizes dual, parallel heuristic optimization to minimize the step counts.

12. The server of claim 11, wherein the dual, parallel heuristic optimization comprises a genetic algorithm and a simulated annealing process.

13. A partial optimization method of wavelengths or spectrum in an optical network, the partial optimization method comprises:
   based on current services in the optical network each having a route and wavelength or spectrum assignment and based on a proportion of services, performing a first stage optimization to determine which of the current services are changed for one or more of the route and the wavelength or spectrum assignment to attain a measurable advantage, wherein the first stage optimization utilizes Integer Linear Programming to minimize an objective function to select routes for which of the current services to change and a Tabu search to determine wavelength assignment, and, responsive to the Integer Linear Programming being intractable, the first stage optimization utilizes a genetic algorithm to determine wavelength assignment;

performing a second stage optimization to determine an order of implementing changes from the first stage optimization with that order minimizing one or more of conflicts and step counts; and causing implementation of the changes in the optical network based on the order to affect the measurable advantage.

14. The partial optimization method of claim 13, further comprising:

performing a plurality of the first stage optimization and the second stage optimization with different values of the ratio of services; and providing an output of the different values of the ratio of services and corresponding wavelength reduction and step count.

15. The partial optimization method of claim 13, wherein the second stage optimization utilizes dual, parallel heuristic optimization to minimize the step counts.

16. The partial optimization method of claim 15, wherein the dual, parallel heuristic optimization comprises a genetic algorithm and a simulated annealing process.

* * * * *